United States Patent

[11] 3,607,323

| [72] | Inventors | Craig S. Tedmon, Jr. <br> Scotia; <br> Stephan P. Mitoff, Elnora, both of N.Y. |
|---|---|---|
| [21] | Appl. No. | 749,070 |
| [22] | Filed | July 31, 1968 |
| [45] | Patented | Sept. 21, 1971 |
| [73] | Assignee | General Electric Company |

[54] SINTERED STABILIZED ZIRCONIA CONTAINING DISCONTINUOUS PHASE OF COBALT-CONTAINING OXIDE
4 Claims, 1 Drawing Fig.

| [52] | U.S. Cl. | 106/57, 136/86 |
|---|---|---|
| [51] | Int. Cl. | C04b 35/48 |
| [50] | Field of Search | 106/57; 136/86 |

[56] References Cited
UNITED STATES PATENTS

| 3,410,728 | 11/1968 | Fullman et al. | 106/57 |
|---|---|---|---|
| 3,436,269 | 4/1969 | Mitoff | 106/57 |

*Primary Examiner*—James E. Poer
*Attorneys*—Richard R. Brainard, Paul A. Frank, Charles T. Watts, Leo I. MaLossi, Frank L. Neuhauser, Oscar B. Waddell and Melvin M. Goldenberg ABSTRACT: The resistance of a zirconia mass or layer to gas penetration is maximized by sintering the zirconia body with a cobalt-containing sintering agent present therein as a separate phase. In the case of stabilized zirconia the cobalt-containing sintering agent may be introduced either during or after stabilization.

PATENTED SEP 21 1971
3,607,323
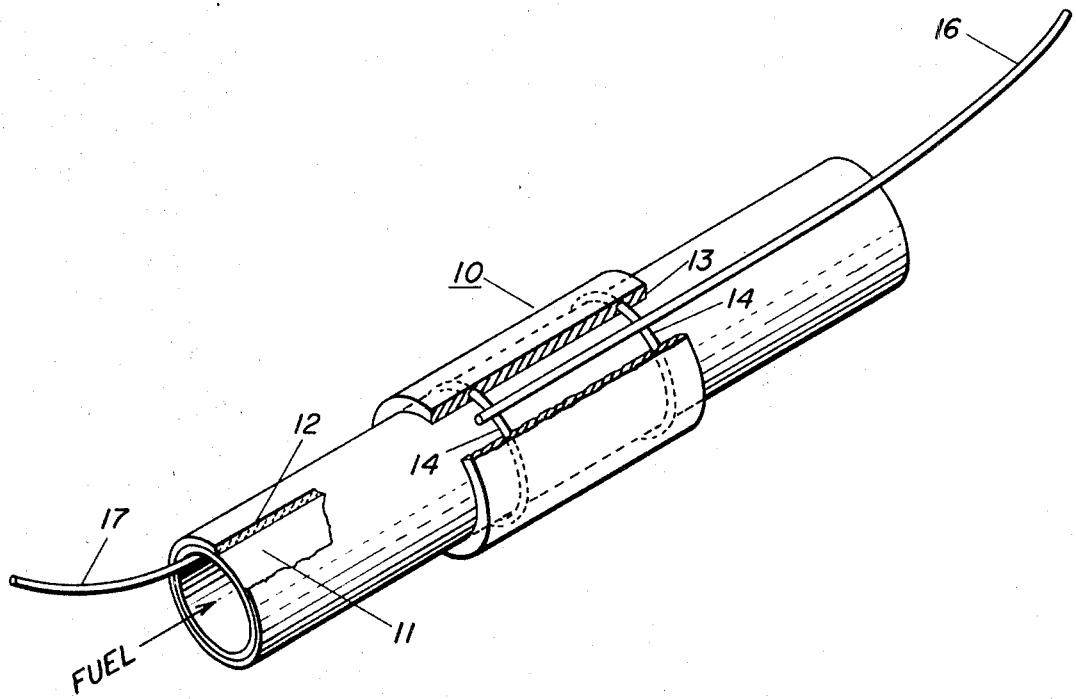
INVENTORS:
STEPHAN P. MITOFF
CRAIG S. TEDMON JR.,
by Leo I. Marlossi
THEIR ATTORNEY

SINTERED STABILIZED ZIRCONIA CONTAINING DISCONTINUOUS PHASE OF COBALT-CONTAINING OXIDE

BACKGROUND OF THE INVENTION

Solid oxygen-ion electrolyte fuel cell structures for operation at elevated temperatures are broadly old. Such fuel cells employ in combination a solid oxygen-ion electrolyte layer having electrodes at opposite faces thereof; gaseous fuel is supplied to one electrode, a gaseous oxidant is supplied to the other electrode and an electrical lead is connected to each electrode.

Such fuel cell structures have been used to generate low voltage direct current power and as oxygen sensors. Also, when operated in reverse (electrical power supplied to the electrodes) such a construction will function as an oxygen pump (or oxygen concentrator) or may be used to dissociate water vapor and produce hydrogen as is described in U.S. Pat. application Ser. No. 742,653—Spacil, filed July 5, 1968. The Spacil patent application is assigned to the assignee of the instant invention.

Various electrode-electrolyte constructions to which the instant invention may be applied are described in the following U.S. Pat. application: Ser. No. 645,288—Mitoff, filed June 12, 1967, (now U.S. Pat. No. 3,533,849); Ser. No. 680,245—Spacil, filed Nov. 2, 1967, (now U.S. Pat. No. 3,503,809), and Ser No. 645,423—Tedmon et al., filed June 12, 1967, (now U.S. Pat. No. 3,522,097). All of the above-mentioned patent applications are assigned to the assignee of the instant invention and all are incorporated by reference herein.

Zirconia, which is the preferred solid oxygen-ion electrolyte material, may be purchased commercially either already stabilized or in a relatively pure state for stabilization (conversion from monoclinic zirconia to cubic zirconia) by the user. Typical analyses of the prestabilized and unstabilized zirconias used in the practice of this invention are set forth below:

| Prestabilized | | Unstabilized | |
|---|---|---|---|
| $ZrO_2$* | 93.94 | $ZrO_2$* | 99.08 |
| $SiO_2$ | 0.62 | $SiO_2$ | 0.18 |
| $Fe_2O_3$ | 0.10 | CaO | 0.22 |
| $TiO_2$ | 0.11 | MgO | 0.15 |
| CaO | 4.80 | $Fe_2O_3$ | 0.10 |
| MgO 3 | 0.25 | $Al_2O_3$ | 0.16 |
| $Al_2O_3$ | 0.18 | $TiO_2$ | 0.11 |
| | 100.00 | | 100.00 |

* traces of $HfO_2$

When stabilized, zirconia is a compound with a cubic crystal structure consisting of zirconia to which has been added calcium oxide, magnesium oxide, yttrium oxide, ytterbium oxide, or a mixture of rare earth oxides. For example, a preferred solid zirconia member employed as an electrolyte is stabilized with 11 mole percent calcium oxide. Other stabilized zirconias, which may also be employed as solid electrolytes are discussed in "Oxide Ceramics" by Ryshkewitch, Academic Press, 1960, particularly on pages 354, 364 and 376 thereof.

One of the problems faced in the use of zirconia as an oxygen-ion electrolyte is that of the passage of gas through the zirconia body or layer. By minimizing such gas penetration, the operating efficiency of the cell is increased. A stabilized zirconia electrolyte containing integrally therein a minor proportion of iron oxide is disclosed in application Ser. No. 412,158,—Mitoff, filed Nov. 18, 1964, now U.S. Pat. No. 3,404,039 and assigned to the assignee of this invention. This modified zirconia electrolyte permits minimal gas passage therethrough and provides an essentially ionic conductor.

Stabilized zirconia oxide can be made impervious to gases by firing a pressed, cast, or sprayed compact thereof to a temperature between about 1700° C. and 1900° C. without the use of additives. However, it is desirable to be able to produce this dense condition by firing to temperatures below 1700° C. This is particularly true in those cases in which the zirconia has been preformed as a composite together with a metal electrode, which may for example cover one major surface thereof. It may be impossible to fire such composites in the 1700°–1900° C. range without destroying the composite itself.

Another problem which is specific to electrode-electrolyte constructions in which praseodymium cobaltate is employed as the electrode material and stabilized zirconia is the electrolyte is the gradual, long term degradation in cell performance experienced. It has been hypothesized that this decrease in cell output may arise from an interaction between the praseodymium-cobaltate and the zirconia as the result of which cobalt from the praseodymium-cobaltate becomes slowly dissolved therein.

SUMMARY OF THE INVENTION

The densification of zirconia, is accomplished by providing for the presence of a cobalt-containing oxide phase within the solid oxygen-ion material during sintering. The presence of the cobalt-containing oxide in the sintered zirconia is of particular advantage if this material is to be employed as an electrolyte layer in contact with a deposit of praseodymium cobaltate electrode. Thus, in the application of this invention to the above construction not only is the presence of the cobalt-containing oxide phase important during sintering, but the presence of the cobalt-containing oxide as a discontinuous phase after sintering is desirable.

BRIEF DESCRIPTION OF THE DRAWING

The exact nature of this invention as well as objects and advantages thereof will be readily apparent from consideration of the following specification relating to the annexed drawing which displays a three-dimensional representation, partially cut away, of a typical fuel cell construction showing the layered arrangement of the anode, zirconia electrolyte and cathode with a current collecting grid and conductor element for carrying the current out of the hot zone wherein the fuel cell operates.

DESCRIPTION OF THE PREFERRED EMBODIMENT

Exemplary construction of the fuel cell 10 shown consists of a series of superimposed concentric layers (anode 11, electrolyte 12 and cathode 13). A current collector structure is generally required, as for example wire hoops 14 shown connected to larger diameter wire lead 16 and located between the outside surface of the zirconia electrolyte layer 12 and cathode layer 13. The simple current collector structure shown in the drawing may be employed with a praseodymium cobaltate cathode, since this material has a much greater conductivity than prior art cathode materials. More complicated grid structures are necessary with other known cathode materials. The electrical contact established between hoops 14 and the cathode material is carried to cathode lead 16 and thence out of the hot operating zone wherein temperatures in excess of 800° C. are commonly employed. Lead 17 connected to anode 11, which may for example be nickel, provides for exterior connection to the anode. Fuel is admitted to the interior of the structure as shown and a gaseous oxidant, such as air, is freely admitted over the outside surface of cell 10 isolated from the fuel flow.

Regardless of the method of formation of the zirconia electrolyte layer 12, at some point during the preparation of the fuel cell structure, the zirconia must be densified to render it substantially impermeable to gas penetration. It is particularly advantageous to be able to accomplish this densification at temperatures below about 1400° C.

It has been discovered that by having present in the zirconia from about one-fourth to about 5 percent by weight of cobalt during the sintering operation this sintering may be accomplished at or below 1400° C. The amount of cobalt-containing oxide phase present must be less than that, which will produce a continuous second phase in the sintered zirconia. Such a second phase would result in electronic short circuiting of the zirconia electrolyte layer during operation. The cobalt may be added in the form of cobalt oxide, cobalt carbonate, cobalt nitrate or cobalt acetate. In the case of the latter three compounds, the volatile species is quickly driven off during heating leaving cobalt in the form of cobalt oxide.

Cobalt oxide is only slightly soluble (less than about one-half percent by weight) in stabilized zirconia and most of the cobalt oxide remains in some form of cobalt-containing oxide second phase. For some unexplained reason, although cobalt oxide in bulk acts as a poor oxygen-ion transport medium, the effectiveness of the sintered zirconia to function as an oxygen-ion transport material remains undiminished by the introduction of the cobalt oxide. The cobaltcontaining oxide is probably present as a liquid phase at the higher sintering temperatures (about 1300°–about 1400° C.) and under these conditions is probably distributed as a surface layer over the zirconia particles. This second phase is not present in sufficient quantity to constitute a continuous phase in the sintered zirconia layer or body, however, Similar treatment of zirconia with nickel oxide does not work well, probably because of the greater solubility of nickel in stabilized zirconia.

The presence of this second phase containing cobalt ions is of particular importance in a composite structure wherein a cobaltate deposit remains in contact with stabilized zirconia and is subjected to high temperatures (over 800° C.) for long periods of time. It is believed that an interaction occurs under these conditions between the stabilized zirconia and the cobaltate material resulting in slow dissolution of cobalt ions from the cobaltate into the stabilized zirconia thereby chemically altering the cobaltate material possibly increasing the electrical resistance thereof. This mechanism would explain in part the long term degradation, which occurs in the performance capabilities of a high-temperature fuel cell having a praseodymium-cobaltate cathode in contact with an iron-doped, yttrium-stabilized zirconia electrolyte. Although the degradation in performance is very slow, it would be preferred to further slow down or eliminate this degradation in performance.

Another unexpected advantage of the cobalt doping of stabilized zirconia is manifest when a comparison is made between the performance with carbon-containing fuels of high temperature fuel cell structures employing stabilized zirconia electrolytes densified with the cobalt-containing containing oxide phase present and similar cells in which iron was used as the sintering aid. The cells compared each employed praseodymium-cobaltate cathodes, yttrium-stabilized zirconia electrolyte layers and nickel-zirconia cermet anodes. The only difference between cells lay in the sintering aid; cobalt or iron. The zirconia electrolyte layers employing the iron sintering aid degraded rapidly, when operated with carbon-containing fuels. The cells wherein cobalt had been employed as the sintering aid demonstrated stable performance over periods of several hundred hours during operation with carbon-containing fuels. Since any practical application for fuel cells for power generation would necessitate operation with carbon-containing fuels, this constitutes an important improvement.

One way or preparing the solid oxygen-ion body of the instant invention is to employ, for example, zirconia powder which has been stabilized by the addition of 13.75 weight percent of yttria. Such powders are available commercially. From one-fourth to 5 percent by weight of cobalt as for example in the form of cobalt oxide, is added to the stabilized zirconia powder, which powders are then mixed and ground together. This mixture is then calcined at about 1300° C., resulting in a partially sintered product. This partially sintered powder is reground to provide a powder, which may be pressed into some desired configuration, such as a hollow tubular member, a container or a plate. The pressed configuration is then fired in air in temperatures, which may range from about 1400° C. to about 1200° C. depending upon the amount of cobalt present and the length of the heating period. This firing results in a high density body which is substantially impermeable to gas penetration.

In a preferred method of preparing the solid oxygen-ion body of the instant invention, unstabilized zirconia powder, about 10 to 15 percent yttria and from about 1 to about 5 percent by weight of cobalt are consolidated in the form of spherical agglomerate particles in the manner described in U.S. Pat. No. 3,373,119—Krystyniak, incorporated herein by reference. The larger amount of the cobalt material required compensates for the volatilization loss thereof during plasma spray deposition.

These spherical agglomerate particles are then plasma-sprayed on a suitable substrate or mandrel to secure the desired configuration. During the plasma-spraying operation the zirconia becomes stabilized and a large amount of the ultimate densification necessary occurs. Thereafter, a relatively short heating period in the aforementioned temperature range is required to complete the densification.

If desired, spherical agglomerate particles of prestabilized zirconia physically combined with the cobalt source according to this invention may be plasma-sprayed to simultaneously deposit the material in the configuration desired and also accomplish most of the sintering required. Thereafter, additional sintering for a short period in the temperature range of 1200° C. to 1400° C. is employed.

In the preferred construction according to this invention, each of the layers 11, 12, 13 are deposited by plasma-spray techniques.

Table 1 summarizes some sintering tests made with zirconia The zirconia contained 8 mole percent yttria and test bars were made containing 0, one-half, 1, 2 and 4 weight percent $Co_2O_3$. The test bars were prepared by mixing the stabilized zirconia with powdered cobalt oxide in a slurry with a volatile liquid, as for example methyl alcohol, using a magnetic stirrer, the heating being accomplished in the temperature range of from about 100 to about 150° C. Thereafter, the volatiles were driven off by heating at some temperature in excess of about 1000° C. in air for about 4 hours. The several samples were then sintered at the firing temperatures indicated for each sample and the percent of shrinkage resulting from densification of the bars is set forth in table I.

TABLE 1

| Sample | Firing Temp., °C. | % $Co_2O_3$ | % Shrinkage |
| --- | --- | --- | --- |
| A | 1200 | 0 | 0 |
| B | 1200 | ½ | 3.5 |
| C | 1200 | 1 | 3.3 |
| D | 1200 | 2 | 3.6 |
| E | 1200 | 4 | 3.6 |
| A | 1300 | 0 | 3.3 |
| B | 1300 | ½ | 4.4 |
| C | 1300 | 1 | 5.1 |
| D | 1300 | 2 | 5.6 |
| E | 1300 | 4 | 6.3 |
| A | 1400 | 0 | 3.6 |
| B | 1400 | ½ | 5.3 |
| C | 1400 | 1 | 5.6 |
| D | 1400 | 2 | 5.7 |
| E | 1400 | 4 | 7.6 |

It is apparent from the data presented in table I that the addition of small amounts of cobalt additive have a pronounced beneficial effect on the sintering characteristics of yttra-stabilized zirconia as reflected by the shrinkage resulting from the presence thereof.

Fuel cells and hydrogen generator cells incorporating stabilized zirconia electrolyte containing a cobalt additive according to this invention have been prepared and tested. The test results with these fuel cells indicate that the presence of cobalt in a discontinuous second phase during sintering is at least as effective as iron in promoting the densification of zirconia and the presence of a discontinuous cobalt-containing oxide phase in the sintered zirconia electrolyte is responsible for the continued effective performance of such fuel cells, when exposed to carbon-containing fuels. In each case the electrolyte was deposited using plasma spray techniques.

Four-point electrical resistivity measurements were made on the samples reported in table I. The resistivity measurements were conducted over a temperature range extending from about 300° C. to 1500° C. both in dry air and in wet argon. In summary, the electrical resistances of the sintered samples appeared to be independent of the atmosphere in which the measurements were made thereby indicating that only ionic conductivity was exhibited by the samples. Further, it was found that the addition of cobalt to the zirconia lowered the electrical resistivity of the samples as compared to values of resistivity for the stabilized zirconia without cobalt.

Table II (below) summarizes the pertinent resistivity data resulting from the aforementioned measurements.

TABLE II

| Temp. °C. | Resistivity (ohm-cm.) | |
|---|---|---|
| | 0% 0% $2O_3$ | 2% $Co_2O$thd 3 |
| 500 | $8.0 \times 10^4$ | $2.3 \times 10^4$ |
| 700 | $3.0 \times 10^3$ | $8.5 \times 10^2$ |
| 900 | $2.6 \times 10^2$ | $8.0 \times 10^1$ |
| 1100 | $5.5 \times 10^1$ | $1.8 \times 10^1$ |
| 1300 | $1.5 \times 10^1$ | $5.5 \times 10^0$ |

Thus, it has been found that stabilized zirconia to which even a very small amount of cobalt has been added may be sintered at a temperature lower than the sintering temperature thereof without sintering agent.

The amount of cobaLt contained in the zirconia effective to reduce the sintering temperature of zirconia to or below about 1400° C., (as for example is important in the manufacture of fuel cells) will range from about one-fourth to about 5 percent by weight of cobalt.

For other applications, for example in the preparation of zirconia crucibles, it is of economic advantage to add an amount of cobalt effective to reduce the sintering temperature by as little as 50° C. Also, since nonelectrochemical applications do not present critical limitations such as the retention of low electronic conductance in the zirconia deposit, amounts of cobalt substantially greater than 5 weight percent may be satisfactorily employed to achieve more pronounced reductions in sintering temperature.

Although it may be presumed that the cobalt-containing phase is cobalt oxide, the cobalt may be present in the form of a complex oxide formed, for example, with the zirconia or the stabilizing agent. Probably no complex is formed between the cobalt oxide and the impurities in the zirconia, per se, because the sintering response has been found to be independent of the purity level of the zirconia.

What we claim as new and desire to secure by Letters Patent of the United States is:

1. A sintered zirconia mass substantially impervious to the passage of gaseous molecular species therethrough, said mass consisting essentially of zirconia particles having a discontinuous second phase of cobalt-containing oxide dispersed therethrough with the weight of cobalt present being in the range of from about one-fourth to about 5 percent of said zirconia mass, said zirconia mass being stabilized and exhibiting only ionic conductivity.

2. In the densification of zirconia by the addition of a sintering agent thereto before sintering to provide a second phase during exposure of the zirconia to sintering temperatures in excess of about 1200° C., the improvement wherein the sintering agent added is a cobalt compound with the weight of cobalt present being in the range of from about one-fourth to about 5 percent of the zirconia mass, whereby the sintered zirconia exhibits only ionic conductivity.

3. The improvement as recited in claim 2 wherein the zirconia is stabilized.

4. The improvement as recited in claim 3 wherein the cobalt compound is cobalt oxide.